United States Patent
Zylka

[11] Patent Number: 5,586,832
[45] Date of Patent: Dec. 24, 1996

[54] TWO PIECE INTERLOCKING SHAFT ATTACHMENT

[76] Inventor: Karl-Heinz Zylka, 1431 NE. 57th Ct., Fort Lauderdale, Fla. 33334

[21] Appl. No.: 446,479

[22] Filed: May 22, 1995

[51] Int. Cl.$^6$ .................. B25G 3/00; F16D 1/00; F16H 55/12
[52] U.S. Cl. .................. 403/344; 403/1; 403/312; 403/345; 403/362; 74/450
[58] Field of Search .................. 403/1, 310, 311, 403/312, 337, 339, 340, 362, 344, 375, 345, 373; 74/450

[56] References Cited

U.S. PATENT DOCUMENTS

| | | | |
|---|---|---|---|
| 428,058 | 5/1890 | Richards, Jr. | 403/344 |
| 714,605 | 11/1902 | Potter | 403/344 |
| 1,151,131 | 8/1915 | Starpiler | 403/344 |
| 1,201,863 | 10/1916 | Orey | 403/344 |
| 3,106,101 | 10/1963 | Harriman | 74/450 |
| 4,998,841 | 3/1991 | Wilde | 403/362 |
| 5,024,303 | 6/1991 | Kosloff | 403/362 X |

FOREIGN PATENT DOCUMENTS 118786  2/1927  Switzerland .................. 403/344

*Primary Examiner*—Kenneth J. Dorner
*Assistant Examiner*—Bruce A. Lev
*Attorney, Agent, or Firm*—Alvin S. Blum

[57] ABSTRACT

An attachment for mounting on a rod or shaft when an end of the rod is not free, in the form of a split collar, pulley or gear, is in two parts having half-cylinder inner portions. The parts may be mounted on diametrally opposed sides of a rod or shaft when axially displaced from one another. Each part has a pair of interlocking elements. Each of the pair of interlocking elements of the first part interdigitates and thereby interlocks with one of the interlocking elements of the other part when the two parts are moved together axially to form a completely encircling attachment on the rod which resists radial dismemberment. A threaded passage extends radially through at least one of the parts to receive a long threaded fastener such as a thumbscrew to fixedly engage the rod. The attachment may be readily and rapidly mounted, locked and removed by an unskilled user without the use of any tools.

14 Claims, 1 Drawing Sheet

TWO PIECE INTERLOCKING SHAFT ATTACHMENT

BACKGROUND OF THE INVENTION

This invention relates to attachments to shafts and more particularly to an attachment with a radial screw for locking onto a shaft made in two pieces which slide together axially to interlock to form an annular collar, pulley, gear or the like.

When an annular element such as a pulley, collar or gear is to be fixed to a shaft, it is generally provided with a center hole to receive the free end of the shaft. The element is moved along the shaft to the desired position and locked in place by a radial screw threaded through the element and forced against the shaft. When the shaft end is not free, installation of the element is a problem. Shaft collars made in two parts which are joined together by several screws after application to the shaft are known in the art. These are expensive to fabricate, awkward to apply, and direct excessive force on the screw threads.

SUMMARY OF THE INVENTION

It is accordingly an object of the invention to provide a locking shaft attachment which may be applied to a shaft when neither end is free, that is inexpensive and simple to manufacture, that may be easily applied without special skills or tools and in which the parts are held together by stronger connections than screw threads.

The shaft attachment of the invention comprises two identical parts which can be applied to two sides of a shaft. The two parts interlock with each other when moved axially. A threaded radial hole receives a screw fastener such as a set screw or thumb screw which can be forced against the shaft to lock the attachment in place. Before engaging the shaft, the screw locks the two parts of the attachment together against relative axial movement.

These and other objects, advantages and features of the invention will become apparent when the detailed description is considered in conjunction with the drawings.

DETAILED DESCRIPTION OF PREFERRED EMBODIMENTS

Figure 5:
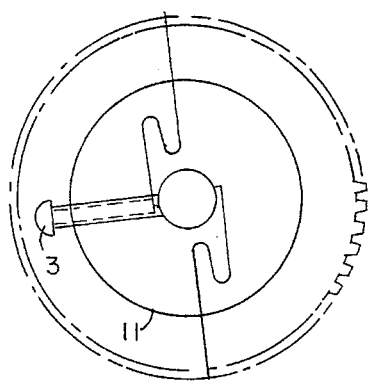
FIG. 5 is a plan view of a gear of the invention.
Figure 6:
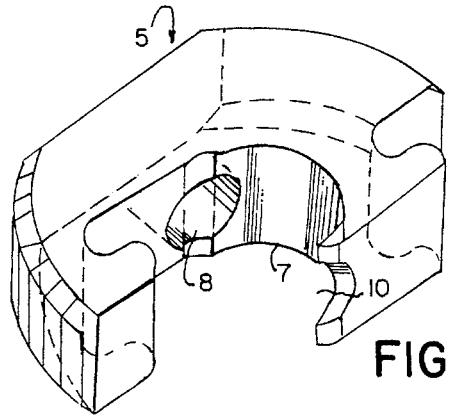
FIG. 6 is a computer generated view as in FIG. 3 showing all of the surfaces of the segment.

In the drawings, like numerals designate corresponding parts throughout the figures.

Figure 1:
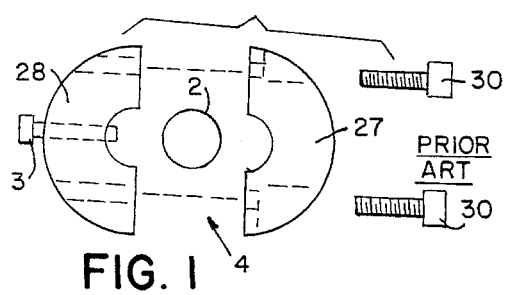
FIG. 1 shows an exploded plan view of a split collar of the prior art.
Figure 3:
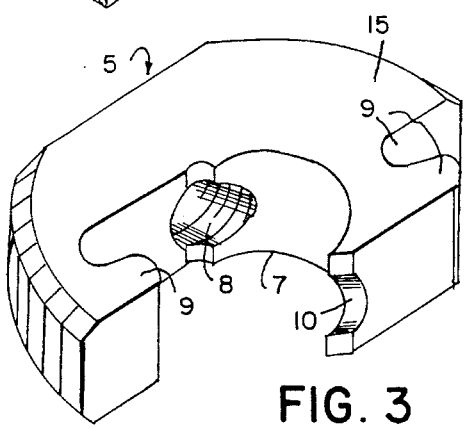
FIG. 3 is a perspective view of one segment of the collar of FIG. 2.

Referring now first to FIG. 1, the split collar 4 of the prior art, two pieces 27, 28 are applied to opposite sides of rod 2 and held in place manually while connecting screws 30 are used to join piece 27 to piece 28, using a screwdriver or set screw wrench. After joining the two pieces, locking screw 3 is tightened against the rod. This is awkward, and requires use of a tool.

Figure 2:
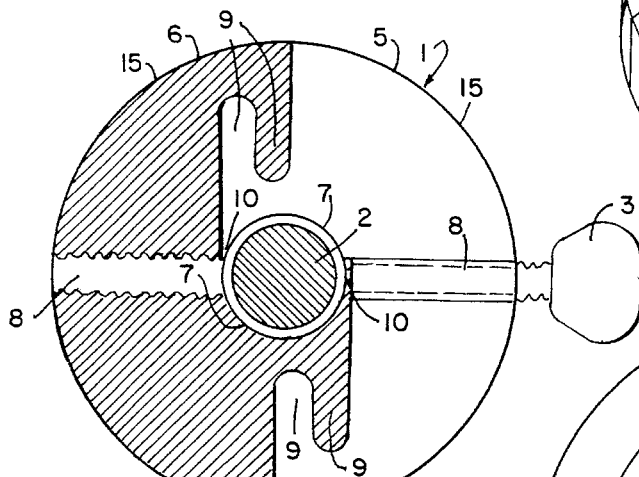
FIG. 2 is a plan view of a collar of the invention, partially broken away.

Referring now to FIGS. 2, 3, 6, and 7, the locking collar 1 of the invention comprises a first part or segment 5 and a second part 6 (partially broken away) in FIG. 2. In this embodiment, both parts are identical, having an edge portion 7 defining a half cylinder with a diameter slightly larger than the diameter of the rod or shaft 2 to which it is designed to attach. A threaded radial passage 8, receives threaded, elongate locking fastener 3 for engaging the rod and preventing lateral movement thereon. Because a thumbscrew is employed, no tools are necessary to assemble and apply or remove the collar 1 from the shaft. Each part is provided with a pair of interlocking edge elements or members 9 disposed substantially diametrally about the cylindrical opening formed when the two parts are locked together as shown in FIG. 2. In order to so lock the two parts together around the rod 2, the two half cylinders 7 are first applied to diametrically opposed sides of the rod while spaced apart axially from one another, and then the two parts are moved together axially so that the interlocking elements or members 9 interdigitate with one another to thereby form a completely encircling attachment around the rod. The thumbscrew 3 is then advanced until it tightly engages the rod, forcing the two parts tightly together to resist radial dismemberment and axial movement on the rod. To further enhance alignment and interlocking of the two parts, an aperture or notch 10 may be provided extending radially from the half cylinder portion 7 and so arranged as to align with the passage 8 to receive the thumbscrew 3 prior to thumbscrew 3 engaging rod 2. This ensures that the two parts are prevented from axial motion relative to one another.

The perimeters 15 of parts 5 and 6 are preferably formed with the geometric property of being generatable by movement of an axial line. This ensures greater surface contact of the interlocking elements for enhanced frictional engagement and easier forming by molding or extrusion.

An important application for this easily applied embodiment is for use in holding up the rear door of a station wagon or van when the lifting device fails to hold it up. The device fits around the rod of the spring/shock absorber and clamps in place with simple hand motions and is just as easily removed when ready to close the door.

The prior art provides for means to replace an endless belt on pulleys when it is too awkward to free one end of the pulley. These means include a straight belt length which can be joined at the ends after mounting on the pulleys. However, no prior art means are provided for replacing a damaged pulley or a gear on a shaft without freeing one end of the shaft to slip on the pulley or gear.

Figure 4:
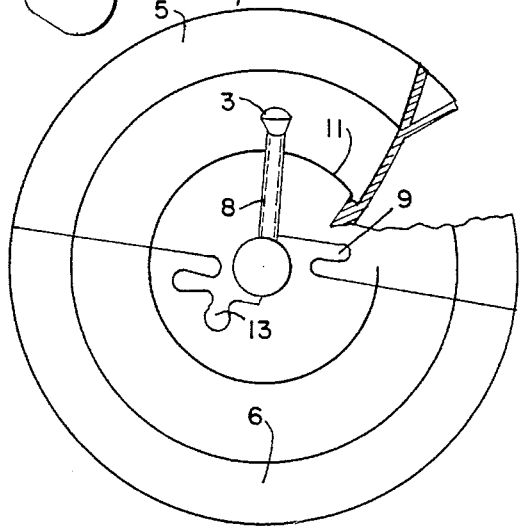
FIG. 4 is a plan view of a pulley of the invention.
Figure 7:
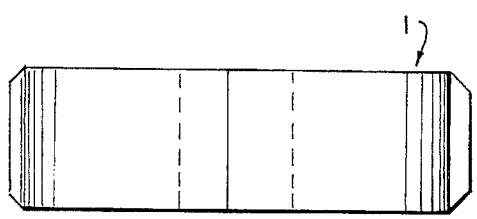
FIG. 7 is a side view of the collar of FIG. 2.

FIG. 4 shows a V-pulley 12 embodiment of the instant invention in which the two parts 5, 6 interlock about the shaft and set screw 3 in hub 11 is then advanced to engage the shaft. As shown, the two parts 5 and 6 are not identical, the interlocking elements 9 is different than the interlocking member 13. Only member 5 has a threaded passage 8.

There may be situations where it is more economical to make the two parts identical, since tooling costs may be halved.

FIG. 5 shows a gear embodiment 14 of the invention with a locking screw 3 in hub 11. This embodiment may facilitate repair of a gear in a complex apparatus without requiring so much disassembly of the apparatus.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. A two part encircling attachment for affixing to a rod or shaft, the attachment comprising:
   (A) a first part having an edge portion substantially defining a half cylinder having an axis, a particular diameter, and a first pair of interlocking edge elements substantially diametrally opposed to one another;
   (B) a second part having an edge portion substantially defining a half cylinder and a second pair of interlocking edge elements substantially diametrally opposed to one another;
   (C) each of said pair of interlocking edge elements of said first part being arranged to interdigitate and thereby interlock with one of said interlocking edge elements of said second part when said edge elements of said first and second parts are moved together axially to form a completely encircling cylindrical attachment which resists radial dismemberment;
   (D) a threaded passage extending radially through said first part intermediate the edge elements of said first part;
   (E) an elongate threaded fastener arranged to be threadedly received in and through said passage for locking said attachment against said rod or shaft after said parts have been moved together to thereby prevent axial motion of said attachment on said rod or shaft;
   (F) a radially extending aperture at one of said second pair of edge elements and adapted for aligning with said passage in said first part to receive said fastener passing through said passage prior to said fastener engaging said rod or shaft to thereby prevent relative axial movement between said parts.

2. The attachment according to claim 1, in which said threaded fastener is a thumbscrew and said attachment is arranged to be installed and locked on said rod or shaft and removed therefrom manually and easily without the use of any tools.

3. The attachment according to claim 2, in which said first and second parts are identical.

4. The attachment according to claim 1, in which said threaded fastener is a thumbscrew and said attachment is arranged to be installed and locked on said rod or shaft and removed therefrom manually and easily without the use of any tools.

5. The attachment according to claim 4, in which said first and second parts are identical.

6. The attachment according to claim 4, in which said first and second parts have identical perimeters.

7. The attachment according to claim 1, in which said first and second parts have perimeters which have the geometric property of being substantially generated by movement of an axial line.

8. The attachment according to claim 1, in which said first and second parts have perimeters which have the geometric property of being substantially generated by movement of an axial line.

9. The attachment of claim 8, in the form of a locking collar.

10. The attachment of claim 8, in the form of a pulley.

11. The attachment of claim 8, in the form of a gear.

12. The attachment of claim 1, in the form of a locking collar.

13. The attachment of claim 1, in the form of a pulley.

14. The attachment of claim 1, in the form of a gear.

* * * * *